INVENTOR.
Saulius M. Jameikis
BY Nicholas A. Camasto
ATTY.

INVENTOR.
Saulius M. Jameikis
BY Nicholas A. Camasto
ATTY.

INVENTOR.
Saulius M. Jameikis
BY Nicholas A. Camasto
ATTY.

United States Patent Office 3,482,495

Patented Dec. 9, 1969

3,482,495

LIGHTHOUSE ALIGNMENT APPARATUS

Saulius M. Jameikis, Chicago, Ill., assignor to Admiral Corporation, Chicago, Ill., a corporation of Delaware Filed July 14, 1967, Ser. No. 653,476
Int. Cl. H04n *9/02;* G03c *7/04*
U.S. Cl. 95—1 15 Claims

ABSTRACT OF THE DISCLOSURE

Apparatus for aligning lighthouses used in the manufacture of color television picture tubes. The apparatus comprises an alignment panel positioned on a lighthouse exposure table having a plurality of first reflective surfaces and associated second reflective surfaces. Each of the first and second reflective surfaces are exposed to light emanating from the light source, which light is refracted at a specific angle relative to a vertical axes of the lighthouse. The alignment panel carries a screen having a target corresponding to each of the first and second reflective surfaces located as a position remote from the normal incidene of light on the panel. A corresponding plurality of focusing lenses is provided for focusing the light striking each of the first and second reflective surfaces onto the screen, thereby forming a relative large, well-defined light image on its associated target for accurately aligning a second lighthouse. Each of the first reflective surfaces may be readily varied to compensate for misalignment of the light image on its associated target caused by mishandling of the apparatus.

This invention relates in general to lighthouses used in the manufacture of color television picture tubes, and in particular to apparatus for aligning lighthouses used in production to insure proper light registration on a previously coated photosensitive phosphor screen of a picture tube face panel. More particularly, this invention is concerned with a durable, adjustable, alignment panel for transferring alignment information from a laboratory standard lighthouse which is known to be capable of producing a correctly exposed phosphor screen, to a production lighthouse of which the exposure capabilities and accuracy are unknown or in question.

An extremely important step in the manufacture of color television picture tubes comprises establishing three color groups of phosphor dots on a face panel, by successively exposing several applications of photosensitive phosphor emulsion deposited thereon. The establishment of phosphor dots in their correct locations on the face panel must be extremely accurate, since mislocation of the dots will cause improper and erratic colors in an image produced on the picture tube screen.

A device called a lighthouse is typically used for the exposure of a picture tube face plate. The face plate is mounted on a table of the lighthouse, in the path of light rays from a light source. Light emitted from the source is collimated and emerges from a tip which represents the location of an emerging beam of electrons from the electron gun of an assembled picture tube.

The photosensitive phosphor emulsion deposited on the interior of the picture tube face plate is exposed by projecting the collimated light through an associated aperture mask maintained adjacent it. Light passing through each aperture of the aperature mask forms one phosphor dot on the photosensitive emulsion, therefore the mask is the primary factor in placing each of the dots in its correct location. The correct location of each phosphor dot cannot be overemphasized since it is extremely important to the proper performance of the picture tube.

After the mask is properly positioned relative to the face plate, the impingement of light on the phosphor emulsion is influenced by many factors, among which the most important are:

(a) The contour of the exposure lens interposed between the light source and the face panel;

(b) The distance between the exposure lens and the face panel;

(c) The distance between the light emitting tip and the exposure lens;

(d) The orientation of the face plate and associated aperture mask with respect to the light emitting tip; and (e) The distance between the aperture mask and the face panel.

During normal operation of a production lighthouse, subsequent to its initial setup, many of the above factors are fixed. For example, the aperture mask is removably secured a specific distance from the face panel in a manner which operation of the lighthouse will not affect. The exposure lens is maintained a certain nonvariable distance from the face plate and aperture mask, and the contour of the exposure lens is permanent once the correct lens design has been determined.

On the other hand, the vertical distance between the light emitting tip and the exposure lens may be varied, and the position of the face plate and aperture mask on the lighthouse may be varied relative to the location of the emitting tip and lens. The distance between the light source and the exposure lens is usually altered each time the high intensity ultraviolet lamp fails. This alteration is due to the enclosure design housing the lamp. Thus, each time the high intensity lamp is replaced, the correct distance between the emitting tip and the exposure lens must be reestablished.

In addition, the face plate normally is positioned on the exposure table by abutting against several position stops. These stops include provisions for adjustment to compensate for wear caused by face panel contact, rubbing, and abrasion. During production, the location of the face panel relative to the emitting tip lens must be tested regularly to determine if wear has occurred, and if so, the position stops must be readjusted.

A typical prior art method of checking a lighthouse to determine whether it is aligned, or in "registration," is by using what is commonly called in the industry, a "reference panel." A reference panel is a laboratory processed face plate and aperture mask having an exposed three color phosphor dot structure developed thereon, but without the normal aluminized over layer. The face plate is exposed on an accurate, laboratory quality lighthouse which is known to be capable of producing a near perfect picture tube face panel. Consequently, the laboratory lighthouse may be used as a standard for making a reference panel and the location of the phosphor dots exposed thereon are known to be nearly perfect.

To check a production lighthouse, this reference panel is placed on the lighthouse exposure table and observations are made to determine if the rays of light from the emitting tip illuminate the correct phosphor dots on the face panel. Since the size of the phosphor dots are extremely small and ill-defined, and the rays of light passing through the apertures of the mask are relatively scattered, these observations must be performed with the aid of a microscope. Even with a microscope it is time-consuming and difficult to determine whether a particular production lighthouse is aligned, or in registration, since the exposed phosphor dot does not assume a circular shape. Consequently, a subjective evaluation is required.

The actual lighthouse alignment is performed by adjusting the height of the light source and the horizontal location of the face panel with respect thereto. With the reference panel, these adjustments are made until the light passing through the apertures fall on the phosphor dots representing the particular color intended to be exposed by that lighthouse. Observations are taken in several locations to assure that the lighthouse is aligned.

Aligning a lighthouse with a reference panel requires a lengthly training period due to the subjective evaluation of an ill-defined light impinging on an ill-defined phosphor dot. Also, the reference panel is fragile and easily damaged. Once a reference panel is damaged, it is almost impossible to correct the defect. Consequently, the entire face panel and accompanying mask assembly must be discarded and replaced with a new laboratory processed panel. During periods of carelessness, a continual supply of laboratory processed panels may be necessary. In addition, the aperture of the mask which serves as a lens, much like a pin-hole camera, is very close to the screen. Thus, a small change in the location of the screen relative to the light source shows up as only a minute alternation when observed on the exposed screen.

Therefore, it is the principal object of this invention to provide improved apparatus for aligning a lighthouse used in the manufacture of color television picture tubes.

It is a further object of this invention to provide apparatus for duplicating the alignment parameters of a laboratory standard lighthouse on a production lighthouse.

It is an additional object of this invention to provide apparatus for more accurately duplicating alignment information of a laboratory standard lighthouse, on a production lighthouse.

It is also an object of this invention to provide apparatus for duplicating alignment information of a first lighthouse on a second lighthouse without the necessity of a microscope and to decrease the subjective evaluation previously required.

It is a further object of this invention to increase the accuracy of aligning a production lighthouse from a laboratory standard lighthouse.

In accordance with the preferred embodiment of the invention, an alignment panel having the general size and configuration of a picture tube face panel, is provided. The alignment panel includes a plurality of reflecting mirrors located at previously selected arbitrary points about its periphery. The points at which the mirrors are located may be referred to as reference areas, and these areas represent the areas of inspection used in the prior art reference panel. Instead of observing illuminated phosphor dots, the alignment panel is used to determine whether light is striking the mirrors at the correct angles.

This determination is facilitated by the use of a focusing lens and second mirror for each mirror located at the reference area. The lenses and second mirrors focus and reflect the light striking each of the first mirrors onto a screen having a plurality of targets. Light reflected onto the screen actually forms an image which can be lined up with the target by adusting the first mirror.

Prior to aligning a production lighthouse, the alignment panel is positioned on a laboratory standard lighthouse which is known to be capable of exposing a perfect picture tube face panel. The cooperation of each lens and its mirrors establishes an optical lever providing a large image displacement on the screen for a small error in the relative position of the emitting tip to the face plate. The first mirror is adusted to reflect light rays from the emitting tip which strikes it at a specific angle to the vertical, so that the rays form an image in the center of the target. After each image is centered on its target, the alignment panel is placed on a production lighthouse and its light source and exposure table are adjusted so that images in the center of the target are duplicated. The production lighthouse should then be in alignment.

In the event the alignment panel is dropped, bumped, or otherwise physically altered, its alignment characteristics may be realigned merely by adjusting the mirrors. These mirrors are designed to be readjusted, the readjustment being performed on the laboratory lighthouse.

Other objects of this invention will become apparent from a consideration of the following description taken in conjunction with the accompanying drawings in which.

Figure 1:
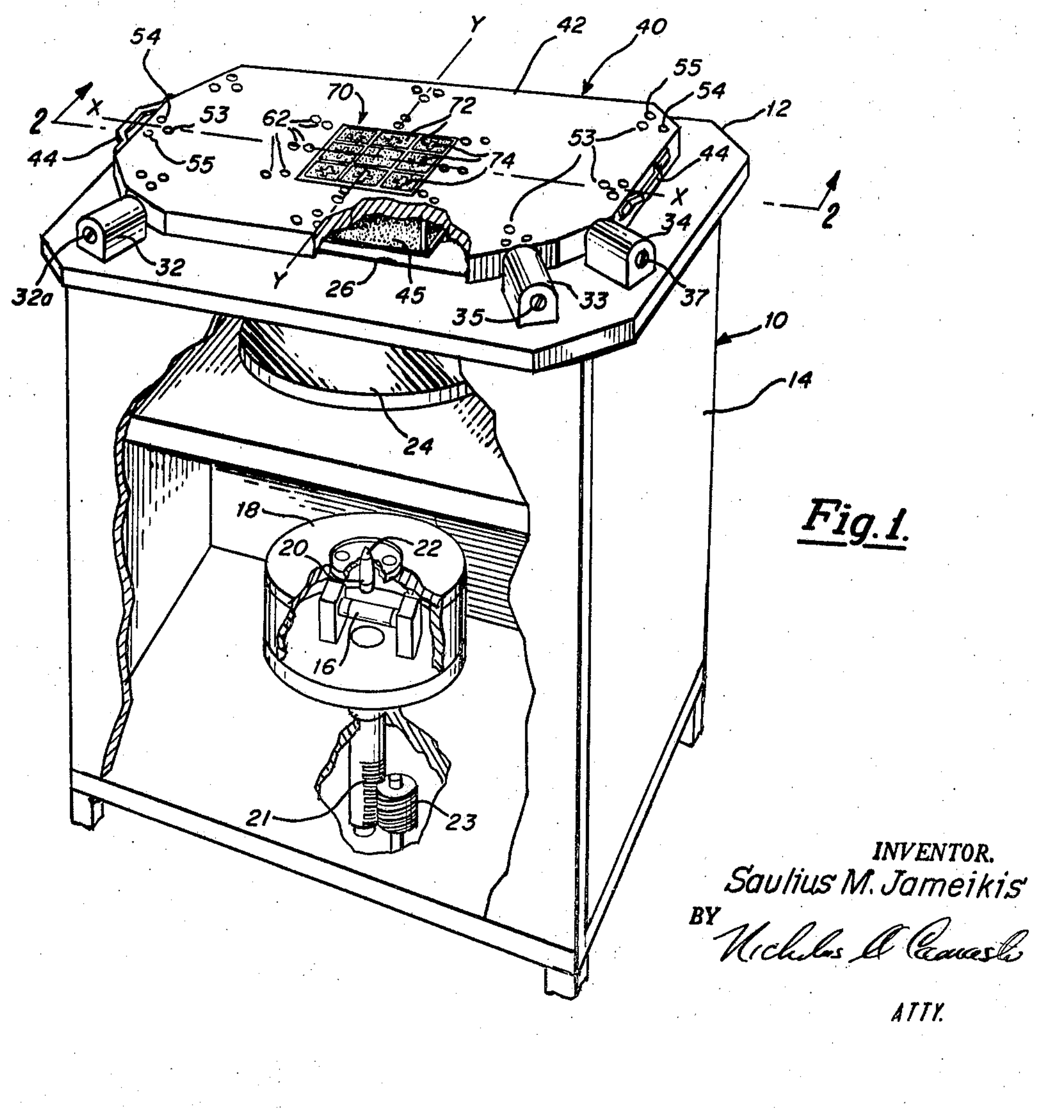
FIG. 1 is a partially cutaway, perspective view of a lighthouse showing its light source, exposure lens and exposure table, with an alignment panel of the invention supported thereon.
Figures 2, 5:
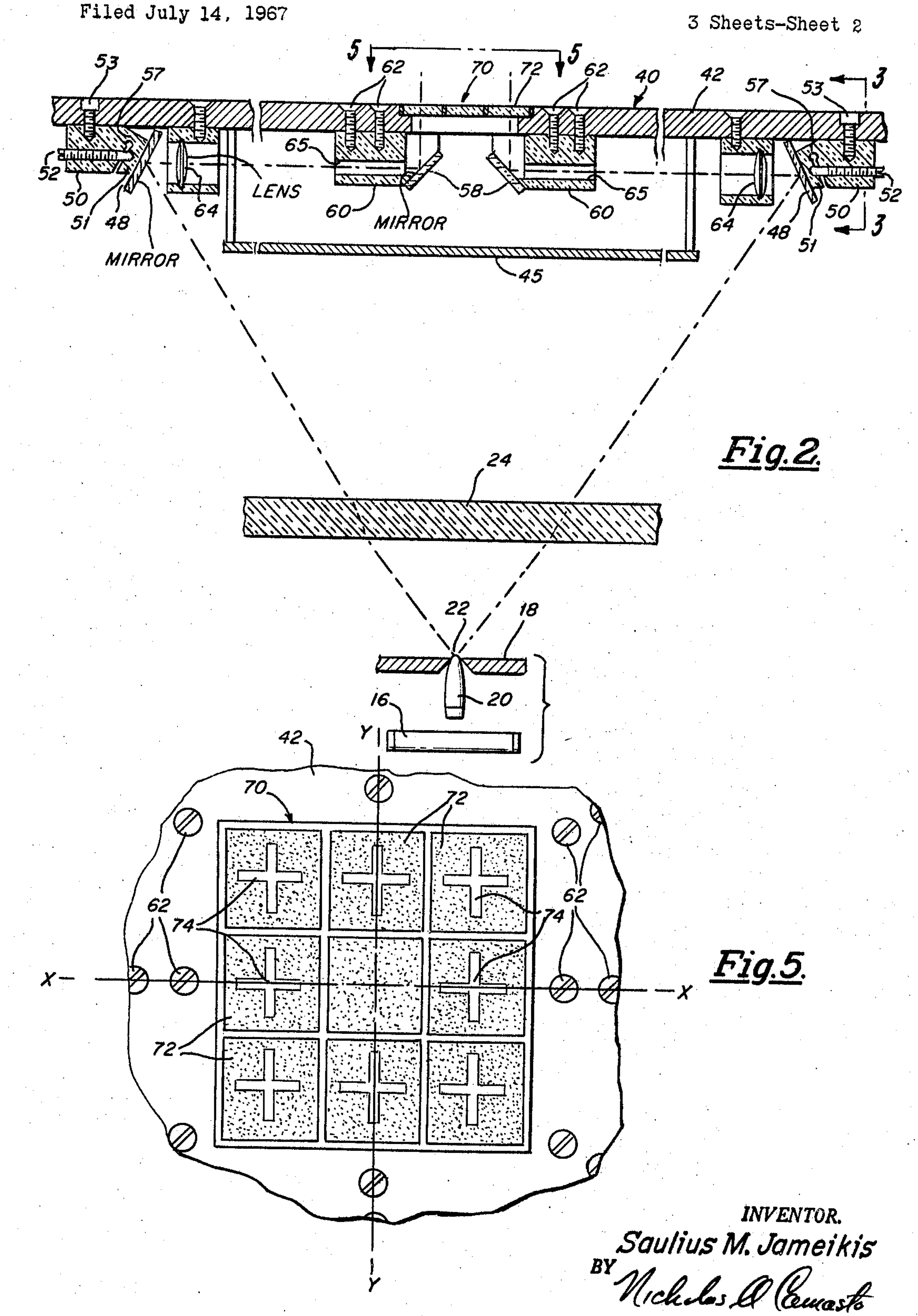
FIG. 2 is an elevation, partially, sectional view taken along lines 2—2 of FIG. 1 showing the more important structure of a lighthouse and the light paths of two principal beams from the light source to the target.
FIG. 5 is an enlarged top plan view of the screen and targets taken along lines 5—5 of FIG. 2.

With reference to FIGS. 1 and 2, a lighthouse generally refered to by reference numeral 10 is shown. The lighthouse comprises an exposure table 12 resting on a lighthouse enclosure 14 enclosing a high intensity light source 16 which is further enclosed by a light box 18. The light box holds a collimator 20 having a light emitting tip 22 extending from the top thereof. The light box may be moved in the vertical direction by any suitable means such as a worm gear arrangement, 21 and 23. Movement of the light box is one of the fundamental adjustments of the lighthouse.

A refractive exposure lens 24 is positioned above the light emitting tip for deflecting the light rays at predetermined angles toward the exposure table. The rays subsequently pass through an opening 26 of table 12, then impinge on whatever light receiving surface is provided.

When the lighthouse is used in production, the light receiving surface is the face panel and aperture mask assembly. On the other hand, during alignment operations, an alignment panel 40 receives the light. The alignment panel is supported on the exposure table and is abutted against position stops 32, 33, and 34. These same stops also position the production face panel on the table, relative to the light source. One screw adjustment, **32*a* 35, and 37 is provided for each position stop 32, 33, and 34**, respectively, to reorient the face panel or the alignment panel on the exposure table. Once the screws are adjusted, they may be locked, and each time a panel is set on the table it will be in the same location relative to the light emitting tip.

Figure 4:
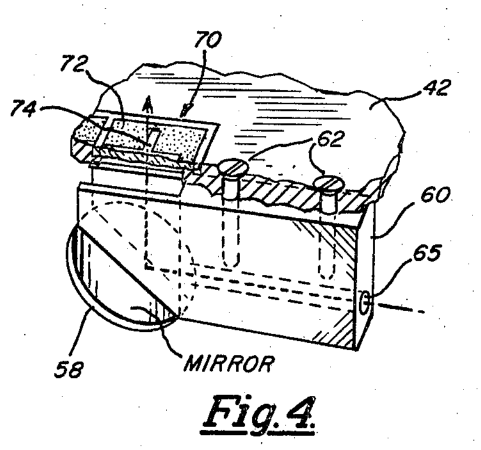
FIG. 4 is a perspective view of a fixed mirror fixture 60 of FIG. 2.
Figure 3:
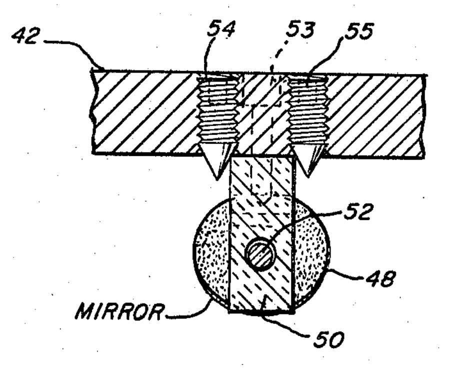
FIG. 3 is an enlarged, sectional, elevational view of a movable mirror fixture 50, taken along line 3—3 of FIG. 2.

Referring now to FIGS. 2, 3, and 4, the structure of the alignment panel and mirror supports will be described in detail. The alignment panel comprises a thermally stable plate 42 having a shape similar to that of a face panel and includes side handles 44 to assist moving it from one lighthouse to another. Plate 42 has mounted thereunder a plurality of light transmitting systems for reflecting a corresponding plurality of light beams emanating from the source and refracted through the exposure lens at specific angles. The light beams are reflected and focused onto a screen also carried by the base. A light shield 45 is suspended below the plate to reduce the quantity and intensity of ambient light reaching the screen.

More particularly, the plate dependently supports eight identical light transmitting systems each comprising an adjustable mirror 48, an associated fixed mirror 58, a focusing lens 64, and a screen 70. Each adjustable mirror 48 is secured to the plate at the vertical attitude of the aperture mask during production, by a mixture 50 having an adjustment screw 52 for adjusting the mirror about its horizontal axis, and two additional adjustment screws 54 and 55 for moving the mirror about a vertical axis (screw 53) in a manner to be explained further below.

The fixed mirror is supported by a stationary fixture 60 dependently secured to plate 42 by threaded fasteners 62.

Each mirror 48 picks up what may be considered a principal beam of light emitted from the source at a particular angle. These light beams are reflected by mirrors 48 to fixed mirrors 58. The focusing lens 64 is positioned between mirrors 48 and 58, for focusing each principal light beam from the first mirror into a well-defined image which is reflected by the second mirror onto a screen 70. The sharp image reflected onto screen 70 is obtained by selecting the focal length and other characteristics of lens 64.

Referring now to FIG. 5, screen 70 which may comprise a screen for each of the light transmitting systems, includes an opaque area 72 having a translucent target 74 etched therein, preferably taking the shape of a cross. The opaque area and translucent target provide excellent light displaying surfaces for the images. During setup on the laboratory standard lighthouse, the adjustments, of the alignment panel are altered so that the image from each of the principal light beams are projected at the center of the crosses. Light shield 45 shields the screen from the light emitted from the collimator to improve the image contrast displayed on the translucent targets.

The basic principle upon which the alignment panel operates is that if a beam of light deflected through the exposure lens strikes the mirror and is reflected onto the center of the screen when the alignment panel is on the laboratory standard lighthouse, and if the images are also centered when the alignment panel is shifted to a production lighthouse, then the alignment parameters of the two lighthouses should be the same. Of course, it must be certain that the laboratory standard lighthouse is in perfact alignment, before setting-up the alignment panel. This could be determined by processing a face panel on the laboratory lighthouse, building a picture tube using this face panel, and visually examining the results on appropriate test apparatus.

With the alignment panel, faster and more accurate alignment of a production lighthouse can be achieved because of the grouping of screens and the optical lever provided by the mirrors and lens. The optical lever provides a large visual display on the target, for an error in the location of the alignment panel relative to the emitting tip.

Referring specifically to FIGS. 4 and 5, a more detailed description of the fixtures supporting the movable and fixed mirrors is provided. The movable mirror 48 and its fixture 50 is pivoted about its vertical axis on screw 53, the movement being accomplished by one of two screws 54 and 55 each having circularly tapered ends contacting the fixture. As one screw is turned inwardly, and the other outwardly, fixture 50 will pivot about its vertical axis. Movement of the mirror about its horizontal axis is accomplished by bending a segmented portion 51 of the fixture. The segment is provided by a kerf through the fixture terminating in a deformable hinge portion 57. A longitudinal screw 52 pivots the segment 51 and attached mirror 48 about the horizontal axis.

The fixed mirror is supported at approximately 45° to the vertical by fixture 60. Light reflected from mirror 48 after being focused by lens 64, passes through an aperture 65 of fixture 60 and is then reflected vertically to the target screen by mirror 56.

Figure 6:
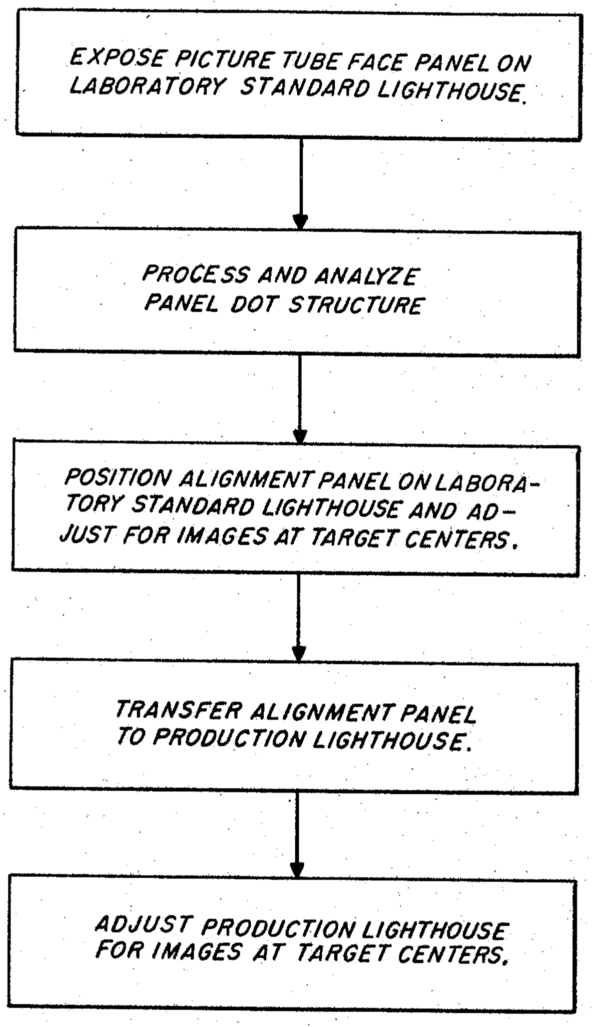
FIG. 6 is a flow diagram illustrating the steps of the alignment process.

Referring now to FIG. 6, the process of duplicating alignment characteristics from a laboratory standard lighthouse to a production lighthouse will now be described in detail.

The first step in the process is to expose a picture tube face panel on a laboratory standard lighthouse. The photosensitive phosphor coating is exposed through its associated aperture mask by exactly positioning the face panel on the exposure table of the lighthouse in a manner well-known in the art, and exposing it to the light source for a predetermined time. This produces a plurality of exposed phosphor dots on the face panel in specific locations as determined by the parameters or settings of the exposure table light source, and other variables.

The fact panel is then lifted from the lighthouse, and the aperture mask is removed from adjacent the screen. The screen is processed by washing it to remove the unexposed phosphor which is in the area between the phosphor dots. After the process has been performed three times, the picture tube is assembled using the exposed face panel and aperture mask, and the dot structure and placement is analyzed by any one of numerous means to determine whether the dots are in their correct positions. It should be noted that each of the colors are exposed on lighthouses having slightly different characteristics and lens designs and consequently these would not be interchangeable.

The alignment panel is now placed on the exposure table with each of the movable mirrors exposed to the light refracted from the exposure lens. What has been considered to be a principal beam of light strikes each of the movable mirrors from a specific angle relative to the vertical axis of the lighthouse. This principal light beam strikes the movable mirror at a vertical attitude approximating the location of where the aperture mask would be. With the alignment panel on the laborator standard lighthouse, the movable mirrors are adjusted by screws 52, 54, and 55 so that the principal light beam striking each mirror 48, focused by each lens 64, and reflected by each mirror 58, strikes the center of the translucent target 74 forming individual images thereon.

In the next step of the process, the alignment panel is removed from the laboratory standard lighthouse and placed on the exposure table of a production lighthouse which it is desired to bring into alignment with the standard lighthouse. Naturally, the face panel of the production lighthouse is removed prior to the alignment panel being placed on the exposure table. With the alignment panel on the production lighthouse, the screen and targets are visually observed to determine whether the images are striking the centers of each target. If the images are off-center, adjustments are made at each of the position stops 32, 33, and 34 to alter the position of the alignment plate along the X and the Y axes. Adjustments may be made in the distance between the collimator tip and the alignment panel which will alter the location of the light image on the target screen and effect the alignment of the lighthouse. For example, if the distance between the collimator tip and the face panel is tool large, the image on each screen will appear towards the center of the panel. This may be corrected by lowering the light box and collimator tip.

When each image formed by each of the principal light beams is centered on its respective target, the operator is assured that the production lighthouse is in exact alignment with the laboratory standard lighthouse. Or, to state the result another way, the operator is assured that the angle formed by each of the principal light beams with a vertical plane of the production lighthouse, is identical to a similar angle formed in the laboratory standard lighthouse.

What has been described is an alignment device for duplicating the alignment parameters of a laboratory standard lighthouse on a production lighthouse without the use of a reference panel. The alignment panel is more rugged than the reference panel, and observations may be made wtihout magnification aids. In addition, if the alignment panel is dropped, it may be easily readjusted.

It is obvious that upon study by those skilled in the art the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are defined as follows:

1. Apparatus for duplicating alignment parameters of a first lighthouse on a second lighthouse, wherein said second lighthouse includes, an exposure table adjustably supporting a face panel and its associated aperture mask during exposure of a photosensitive phosphor coating previously deposited on said panel, a light source adjustably disposed a distance from said exposure table, and a refractive exposure lens interposed between said light source and said table, said apparatus comprising: an alignment panel positioned on a lighthouse exposure table, defining a plurality of reference areas, each area exposed to light emanating from said source which is refracted at a specific angle relative to a vertical axis of said lighthouse; said alignment panel carrying screen means having a target corresponding to each of said reference areas; and means transmitting light striking each of said reference areas onto said screen means forming an image thereon; said screen means being located at a position substantially remote from the normal incidence of said light on a face panel; during duplication of said alignment parameters, said alignment panel being substituted for a face panel on said second lighthouse, and its exposure table and light source being adjusted so that the locations of the images formed on said screen means with respect to said targets are identical to the locations of the images fromed on said screen means when said alignment panel is on said first lighthouse.

2. The apparatus as set forth in claim 1 wherein said transmitting means include a corresponding plurality of focusing lenses for focusing the light striking each of said reference areas onto said screen means, each of said lenses thereby forming a relatively large, well-defined light image on its associated target for accurately aligning said second lighthouse.

3. The apparatus as set forth in claim 2 wherein said reference areas comprise first reflective surfaces, and associated second reflective surfaces; each of said first reflective surfaces reflecting the light striking it at said second reflective surface, and said second reflective surface reflecting said light onto said screen means.

4. The apparatus as set forth in claim 3 wherein said first reflective surfaces are located at preselected areas adjacent the periphery of a face panel normally occupying said exposure table, and where said targets are grouped together to facilitate alignment of said second lighthouse.

5. The apparatus as set forth in claim 4 wherein said alignment panel may be replaced on said first lighthouse and each of its first reflective surfaces readily varied to compensate for misalignment thereof caused by mishandling of the apparatus.

6. The apparatus as set forth in claim 5 wherein said first reflective surfaces are positioned to vertically coincide with the plane of curvature of the aperture mask and are dispersed substantially equally about the periphery thereof.

7. In a lighthouse of the type having, a table adjustably supporting a light receiving surface, an associated aperture mask maintained closely adjacent said surface, and an adjustable light source including light distribution means for adjustably distributing a plurality of principal light beams on said surface at specific angles relative to a vertical axis of said lighthouse; improved means for setting-up said table and said light source to duplicate the angular distribution of said principal light beams from a first lighthouse to a second lighthouse, said improved means comprising: an alignment device mounted on said table in a position for exposure to said light distribution means; a plurality of reference areas on said alignment device defined by the intersections of said principal light beams therewith; target screen means carried by said alignment device and remotely located from said reference areas; and means transmitting light from the intersection of each of said principal beams onto said target screen means forming an image thereon; during duplication of the angular distribution of said principal light beams, said alignment device being substituted for said light receiving surface on said second lighthouse, and its table and its light source being adjusted so that the location of the image formed on said target screen means closely approximates the location of the image formed on said target screen means when said alignment panel is on said first lighthouse.

8. The improved means as set forth in claim 7 wherein said light transmitting means include a mirror system for each of said principal light beams; each of said mirror systems intercepting one of said principal beams at said reference area and reflecting it onto said target screen means.

9. The improved means as set forth in claim 8 wherein said target screen means include an individual target for each of said principal light beams, and wherein said light transmitting means further includes a corresponding number of lens means cooperating with said mirror systems for focusing said principal light beams and forming well-defined images on each of said target screen means.

10. The improved means as set forth in claim 9 wherein each of said lens means comprise a single focusing lens selected to provide a substantial depth of field; and wherein each of said lens is positioned between said light source and its target, thereby producing substantial off-centering of said image on said target, for corresponding misalignment of said lighthouse.

11. The improved means as set forth in claim 10 wherein each of said mirror systems include a first mirror located at said reference area and a second mirror; said first mirror including adjustment means for adjusting it on said first lighthouse to reflect the light from said principal light beam to said second mirror, and said second mirror reflecting said light onto said target; and wherein said focusing lens is interposed between said first and second mirrors.

12. The improved means as set forth in claim 11 wherein said target screen means further comprise an opaque screen having translucent targets, said targets being clustered in a group to facilitate viewing during duplication of the angular distribution of said principal light beams; and wherein said reference areas are dispersed about the periphery of said alignment device.

13. A method of duplicating alignment parameters of a first lighthouse on a second lighthouse, wherein each of said lighthouses include an exposure table, a light source, and a refractive exposure lens, and wherein the exposure table and light source of said second lighthouse are adjustable; said method comprising the steps of:

(a) providing a picture tube face panel having a photosensitive phosphor coating thereon, and an associated aperture mask;

(b) positioning said face panel and aperture mask on the exposure table of said first lighthouse, and exposing said phosphor coating;

(c) processing said panel to obtain a phosphor dot structure and analyzing said structure to determine the correct position of said dots;

(d) providing an alignment panel defining a plurality of reference areas each exposable to light refracted through said lens at a specific angle relative to a vertical axis of said lighthouse;

(e) providing said alignment panel with target means corresponding to each of said reference areas, and with means transmitting the light striking each of said reference areas onto said target means, forming images thereon;

(f) substituting said alignment panel on the exposure table of said first lighthouse, for an exposed face plate having correctly positioned dots;

(g) adjusting said light transmitting means of said alignment panel to center said images on said target means;

(h) transferring said alignment panel to the exposure table of said second lighthouse; and (i) adjusting the exposure table and light source of said second lighthouse until said images are centered on said target means.

14. The method as set forth in claim 13 wherein said dot structure on said face plate is analyzed by visual observation through magnifying means; and wherein said images may be visually observed on said target means without the use of magnification means.

15. The method as set forth in claim 14 wherein said light transmitting means establish an optical lever providing substantial displacement of said image on said target means responsive to misalignment of said lighthouse.

References Cited

UNITED STATES PATENTS 3,395,628 8/1968 Kautz et al. ------------- 95—1

NORTON ANSHER, Primary Examiner

R. W. SHEER, Assistant Examiner